Nov. 3, 1964   A. F. G. HANKEN   3,155,901
SYSTEM FOR QUANTITATIVELY MEASURING ONE PROPERTY OF DIELECTRIC
MATERIAL BY APPLYING INPUT SIGNALS AT TWO DIFFERENT
FREQUENCIES TO A CAPACITANCE PROBE AND VARYING ONE
INPUT SIGNAL TO MAINTAIN A CONSTANT RATIO OF
OUTPUT SIGNALS FOR THE TWO FREQUENCIES
Filed May 4, 1961
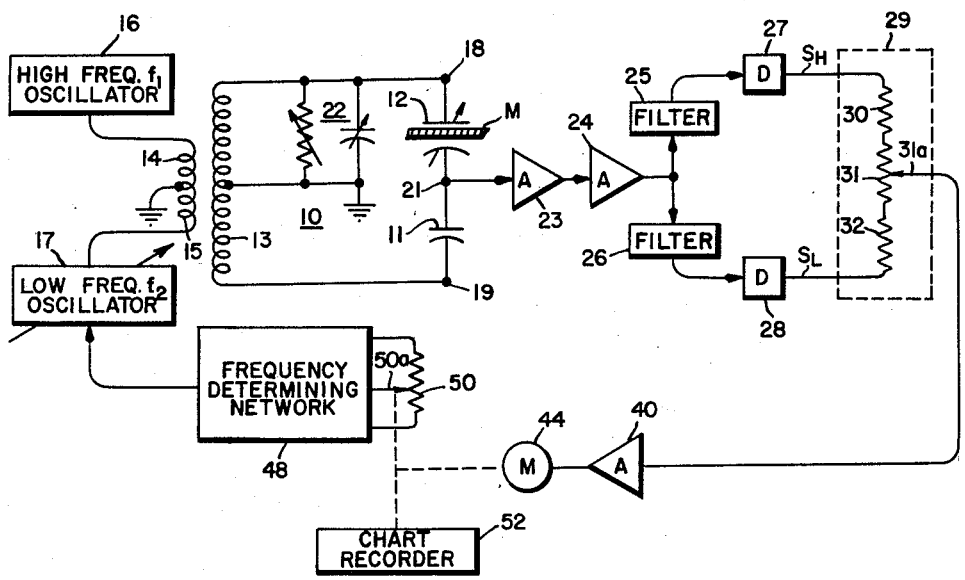
INVENTOR
Albert F. G. Hanken
ATTORNEY

United States Patent Office 3,155,901
Patented Nov. 3, 1964

3,155,901
SYSTEM FOR QUANTITATIVELY MEASURING ONE PROPERTY OF DIELECTRIC MATERIAL BY APPLYING INPUT SIGNALS AT TWO DIFFERENT FREQUENCIES TO A CAPACITANCE PROBE AND VARYING ONE INPUT SIGNAL TO MAINTAIN A CONSTANT RATIO OF OUTPUT SIGNALS FOR THE TWO FREQUENCIES
Albert F. G. Hanken, Columbus, Ohio, assignor to Industrial Nucleonics Corporation, a corporation of Ohio
Filed May 4, 1961, Ser. No. 107,794
6 Claims. (Cl. 324—61)

This invention relates generally to measuring systems and more particularly to capacitance measurements for determining a plurality of properties, such as the weight of material and the moisture content thereof, of a material forming a portion of the dielectric in a capacitor.

Many systems have been provided in the past for measuring the dielectric properties of a material by means of a capacitor gauge for the purpose of determining the quantity of material present, the moisture content of the material, or the kind of material present. In such measurements it is conventional to arrange a bridge circuit in which at least one arm of the bridge includes a capacitor the structure of which is arranged to accept the material to be measured as the dielectric between the electrode of the capacitor. The measurement which is conducted results in an electrical signal indicating a degree of unbalance of the bridge circuit due to a change in the characteristics of the material forming the dielectric of the measuring capacitor. Obviously, this electrical signal will be influenced by any change in the characteristics of the dielectric material in the measuring capacitor which result in a change in impedance of the capacitor and hence a change in the output signal derived from the bridge. Thus in the past considerable effort has been exerted where weight of material is being measured in attempting to eliminate the effect of moisture content on the measurement of the weight of material passing between the plates of the measurement capacitor. In other situations where it is desired to measure or control moisture content, it has been necessary to provide a correction for variation in weight of the material passing through the measuring capacitor in order that the control of the moisture content may not be influenced by weight variations. Where the material being measured is a mixture of different materials having unlike electric properties the measurement of the effective impedance change in the measuring capacitance will likewise reflect the combined effect of the mixture of materials. A specific example of a mixture of materials would be the measurement of the combined effect of the weight of a homogeneous material and its relative water content. While prior art systems have been satisfactory in certain applications they have serious limitations in high speed industrial processes where it is desired accurately to control two variables, such as weight and water content, both of which influence the electrical signal obtained from a capacitance type gauge.

It is accordingly the primary object of the present invention to provide a new and improved dielectric measuring system which is capable of detecting independent properties of a dielectric material even where these properties mutually influence the dielectric measurement.

A still further and more specific object of the invention is to provide an improved dielectric gauge for a continuous process in which the measurement made can be utilized to derive the weight and moisture content of the rod in order that these variables may be employed accurately to control the process.

These and other objects of the invention will be apparent from the following detailed description taken in conjunction with the accompanying drawings wherein the single figure is a block diagram of a measuring system in accordance with the invention.

In accordance with the present invention the dielectric measurements are made with a capacitance bridge energized with two distinct frequencies wherein the first signal is of a fixed frequency and the second signal varies in frequency. The separate signals are processed in accordance with relations between the signals and the independent variables from which they derive to obtain the measure of the independent variables.

Referring now to the drawing a preferred embodiment of the system of the present invention comprises a bridge 10 made up of a capacitor 11 and a capacitive probe 12. The capacitor 12 is adapted to include as a dielectric material M the substance to be measured or controlled in the industrial process. The bridge 10 has inductive arms formed by the two halves of a secondary winding 13 the center tap of which is grounded. The bridge formed by the capacitors 11 and 12 and the two portions of the winding 13 is energized from primary windings 14 and 15 which are supplied with separate frequencies $f_1$ and $f_2$ respectively from the high frequency fixed oscillator 16 and the low frequency variable oscillator 17. With this arrangement the capacitive arms of the bridge have applied at terminals 18 and 19 balanced voltages at the frequencies of oscillators 16, 17 to produce at output terminal 21 signals at the frequencies $f_1$ and $f_2$.

The signals at the frequencies $f_1$ and $f_2$ are amplified in a preamplifier 23 and an amplifier 24 from which they are applied to filters 25 and 26. The filter 25 is adapted to select the signal at frequency $f_1$ and pass it to a detector 27 the output of which is a D.C. signal $S_H$ the magnitude of which varies in accordance with the amplitude of the signal at frequency $f_1$ appearing at terminal 21. In similar manner the output of amplifier 24 is applied to a filter 26 which selectively passes signals of frequency $f_2$ to a detector 28 which produces at its output a signal $S_L$ which is a D.C. signal varying in amplitude according to the amplitude of the signal at terminal 21 of frequency $f_2$. The signals $S_H$ and $S_L$ derived from the detectors 27, 28 are then applied to a computer 29. The computer or bridge 29 comprises fixed resistors 30 and 32 and the variable potentiometer 31. The values of these resistive elements are so chosen and the tap 31a is adjusted so that for a given moisture content of the material M the amplitude of the signals $S_H$ and $S_L$ will be at balance or at a fixed ratio. When the moisture content of the material M varies above or below the target the relative amplitudes of the signals $S_H$ and $S_L$ will vary as a function of the moisture deviation. This in turn will cause an unbalance in the fixed ratio of the bridge 29 in a direction and amplitude directly related to the deviation in moisture.

The error voltage appearing at the tap 31a of potentiometer 31 is amplified at 40 and applied to servomotor 44. The servomotor 44 will respond to a change or an unbalance in the bridge 29 and in turn drives the frequency determining network 48 by adjusting the tap 50a of a slidewire 50. This network converts the error signal into terms of frequency deviation and applies a correcting signal to the low frequency oscillator 17. The signal applied to the low frequency oscillator 17 alters the frequency thereof in a direction and amount to a frequency so that the balanced ratio of the signals $S_H$ and $S_L$ is restored.

The position of tap 50a on slidewire 50 is a function of the moisture content of the material M passing through the capacitance probe 12. This function may be read out on a meter or permanent recorder 52. In an industrial process that would adapt itself to automatic control of moisture content the signal from servomotor 44 would also be utilized as a control voltage.

The present invention has in itself distinct advantages over other prior art moisture gauges. For instance for a continuous industrial process utilizing the present invention there is virtually no limit to the moisture content range, i.e., moisture ranging from 2–12% would be measured. Other advantages are that the voltage loads are almost constant and the low frequency signal is always equal to the high frequency signal multiplied by a constant factor. The signal levels will be substantial and the signal ratio $S_L/S_H$ will be appreciable.

The components making up the system of the present invention are in themselves conventional in design and operation and in many instances are substantially identical to those found in the fixed frequency system of my copending application Serial No. 41,975, filed July 11, 1960. The single exception from standard components is the capacitance probe 12. This probe 12 may have conventional plates permitting the material to pass therebetween. However, it has been found to be more practical and useful to utilize a fringe field capacitor of the grid arrangement type that is positioned on the one side of the material under test. This capacitance probe 12 will be described in fuller detail and claimed in a later filed application of the same inventor and assigned to the same assignee.

Although a certain and specific embodiment is shown, modifications may be had without departing from the spirit and scope of the invention.

What is claimed is:

1. Apparatus for quantitative determination of at least one property of a dielectric material, said apparatus comprising a plurality of sources of electrical signals at different respective frequencies, detecting means, capacitive probe means coupled to said sources having spaced electrodes for applying electrical signals from said sources to at least a portion of said material and electrically coupling said detecting means to said portion, said detecting means including means for deriving separate signals each resulting from the signals applied to said portion from a respective source as these applied signals are influenced by the mass of said material and the dielectric properties of said material at the frequency of that source, means for combining said separate signals to produce a continuous resultant signal that is a function of the ratio of the magnitudes of said separate signals, and means responsive to said resultant signal for varying the output of one of said sources of electrical signals.

2. Apparatus for quantitative determination of at least one property of a dielectric material, said apparatus comprising a plurality of sources of electrical signals at different respective frequencies, detecting means, capacitive probe means coupled to said sources having spaced electrodes for applying electrical signals from said sources to at least a portion of said material and electrically coupling said detecting means to said portion, said detecting means including means for deriving separate signals each resulting from the signals applied to said portion from a respective source as these applied signals are influenced by the mass of said material and the dielectric properties of said material at the frequency of that source, means for combining said separate signals to produce a continuous resultant signal that is a function of the ratio of the magnitudes of said separate signals, and means responsive to said resultant signal for varying the frequency of the output of one of said sources of electrical signals in such direction as to maintain said ratio constant.

3. Apparatus for quantitative determination of the moisture content of a dielectric material, said apparatus comprising a plurality of sources of electrical signals at different respective frequencies, detecting means, capacitive probe means coupled to said sources having spaced electrodes for applying electrical signals from said sources to at least a portion of said material and electrically coupling said detecting means to said portion, said detecting means including means for deriving separate signals each resulting from the signals applied to said portion from a respective source as these applied signals are influenced by the mass of said material and the dielectric properties of said material at the frequency of that source, means for combining said separate signals to produce a continuous resultant signal that is a function of the ratio of the magnitudes of said separate signals, adjustment means responsive to said resultant signal for varying the frequency of the output of one of said sources of electrical signals in such direction as to maintain said ratio constant, and means responsive to the adjustment of said adjustment means for indicating said moisture content of said dielectric material.

4. A system for determining a property of dielectric material comprising: a measuring probe having spaced electrodes for electrically coupling said probe to this material, first signal generating means for generating a high frequency signal, second signal generating means for generating a low frequency signal, means connected to said first and second signal generating means for electrically coupling said high and low frequency signals to said measuring probe, means connected to said measuring probe for deriving a first D.C. signal resulting from and indicative of signals from said probe occasioned by said material at said first frequency and a second D.C. signal of the same polarity resulting from and indicative of signals from said probe occasioned by said material at said second frequency, means responsive to the difference in amplitude of said first and second D.C. signals to vary the output of one of said signal generators in such direction as to reduce said difference substantially to zero, and means for indicating said output of said one of said signal generators as an indication of said property of said dielectric material.

5. A system for determining a property of dielectric material comprising: a measuring probe having spaced electrodes for electrically coupling said probe to said material, first signal generating means for generating a high frequency signal, second signal generating means for generating a low frequency signal, means connected to said first and second signal generating means for electrically coupling said high and low frequency signals to said measuring probe, means connected to said measuring probe for deriving a first D.C. signal resulting from and indicative of signals from said probe occasioned by said material at said first frequency and a second D.C. signal resulting from and indicative of signals from said probe occasioned by said material at said second frequency, means for combining said first and second D.C. signals to produce a resultant signal that is a function of the ratio of the magnitudes of said first and second D.C. signals, adjustment means responsive to said resultant signal for varying the frequency of the output of one of said signal generators in such direction as to maintain said ratio substantially constant, and means responsive to the adjustment of said adjustment means for indicating said property of said dielectric material.

6. A system for determining the moisture content of dielectric material comprising: a measuring probe having spaced electrodes for electrically coupling said probe to said material, first signal generating means for generating a high frequency first signal, second signal generating means for generating a low frequency second signal, means connected to said first and second signal generating means for electrically coupling said high and low frequency signals to said measuring probe, means connected to said measuring probe for deriving a third signal resulting from and indicative of signals from said probe occasioned by said material at said first frequency and a fourth signal resulting from and indicative of signals from said probe occasioned by said material at said second frequency, means for combining said third and fourth signals to produce a resultant fifth signal that is a function of the ratio of the magnitudes of said third and fourth signals, means including a servomotor for varying the frequency of the output of one of said signal generators in such direction as to maintain said ratio substantially constant, and means responsive to the position of said servomotor for indicating the moisture content of said dielectric material.

References Cited in the file of this patent

UNITED STATES PATENTS

| | | |
|---|---|---|
| 2,527,208 | Berry et al. | Oct. 24, 1950 |
| 2,592,101 | Aiken | Apr. 8, 1952 |
| 2,744,233 | Paivinen | May 1, 1956 |
| 2,920,272 | Erdman et al. | Jan. 5, 1960 |

FOREIGN PATENTS

| | | |
|---|---|---|
| 583,981 | Great Britain | Jan. 3, 1947 |
| 217,898 | Australia | Oct. 21, 1958 |